(12) United States Patent
Martin (10) Patent No.: US 11,109,288 B2
(45) Date of Patent: *Aug. 31, 2021

(54) TELECOMMUNICATION DEVICES AND METHODS

(71) Applicant: Sony Corporation, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 324 days.

This patent is subject to a terminal disclaimer.

(21) Appl. No.: 15/664,748

(22) Filed: Jul. 31, 2017

(65) Prior Publication Data

US 2017/0332293 A1 Nov. 16, 2017

Related U.S. Application Data

(63) Continuation of application No. PCT/EP2016/069025, filed on Aug. 10, 2016.

(30) Foreign Application Priority Data

Sep. 21, 2015 (EP) .................................... 15186123

(51) Int. Cl.
*H04W 36/00* (2009.01)
*H04W 48/20* (2009.01)
(Continued)

(52) U.S. Cl.
CPC ....... *H04W 36/0094* (2013.01); *H04W 36/38* (2013.01); *H04W 48/20* (2013.01); *H04W 48/16* (2013.01)

(58) Field of Classification Search
CPC .. H04W 36/0094; H04W 36/38; H04W 48/20
See application file for complete search history.

(56) References Cited

U.S. PATENT DOCUMENTS

| 2009/0129327 A1* | 5/2009 | Horn | H04L 63/104 370/329 |
| 2010/0035615 A1* | 2/2010 | Kitazoe | H04W 48/02 455/436 |

(Continued)

FOREIGN PATENT DOCUMENTS

| CN | 101222759 A | 7/2008 |
| CN | 101651961 A | 2/2010 |

(Continued)

OTHER PUBLICATIONS

International Search Report dated Oct. 26, 2016 in International Patent Application No. PCT/EP2016/069025.

(Continued)

*Primary Examiner* — Ashgar H Bilgrami
(74) *Attorney, Agent, or Firm* — Xsensus, LLP (57) ABSTRACT

A terminal device includes receiver circuitry that receives parameter data from a base station in a cellular wireless telecommunication network. The terminal device also includes a storage device that stores an identifier that uniquely identifies the terminal device, and control circuitry that controls the terminal device. The control circuitry controls the terminal device, when operating in an idle mode, to perform cell reselection using at least one cell reselection parameter derived from the received parameter data and the stored unique identifier.

22 Claims, 5 Drawing Sheets

(51) Int. Cl.
*H04W 36/38* (2009.01)
*H04W 48/16* (2009.01)

(56) References Cited

U.S. PATENT DOCUMENTS

| | | | | |
|---|---|---|---|---|
| 2011/0216732 | A1* | 9/2011 | Maeda | H04W 4/08 370/329 |
| 2011/0255509 | A1* | 10/2011 | Huang | H04W 48/20 370/331 |
| 2013/0183971 | A1* | 7/2013 | Tamaki | H04W 36/0061 455/436 |
| 2014/0066077 | A1 | 3/2014 | Brisebois | |
| 2014/0213277 | A1* | 7/2014 | Jang | H04W 28/08 455/453 |
| 2015/0063216 | A1* | 3/2015 | Ngai | H04W 36/24 370/329 |
| 2015/0319661 | A1* | 11/2015 | Jung | H04W 36/14 455/436 |
| 2016/0286524 | A1* | 9/2016 | Griot | H04L 41/00 |
| 2017/0012792 | A1* | 1/2017 | Chang | H04W 4/06 |
| 2017/0064593 | A1* | 3/2017 | Khay-Ibbat | H04W 36/04 |

FOREIGN PATENT DOCUMENTS

| | | |
|---|---|---|
| CN | 102340704 A | 2/2012 |
| CN | 102625368 A | 8/2012 |
| CN | 104813712 A | 7/2015 |
| JP | 2014-090506 A | 5/2014 |
| WO | WO 2009/134191 A1 | 11/2009 |

OTHER PUBLICATIONS

3GPP TSG-CT WG1 Meeting #90, Sorrento Italy, Feb. 2-6, 2015, C1-150611, Current Version 12.5.0, 3 pages.
3GPP TS 36.304 V12.5.0 (Jun. 2015), Technical Specification, 3rd Generation Partnership Project; Technical Specification Group Radio Access Network; Evolved Universal Terrestrial Radio Access (E-UTRA); User Equipment (UE) procedures in idle mode (Release 12), Jun. 2015, 38 pages.
LTE for UMTS: OFDMA and SC-FDMA Based Radio Access, Harris Holma and Antti Toskala, Wiley 2009, ISBN 978-0-470-99401-6, 4 pages.
Extended European Search Report dated Jul. 9, 2019, issued in corresponding European Patent Application No. 19175791.3, 9 pages.
Office Action dated Aug. 25, 2020, in corresponding Brazilian patent Application No. 112018004127, 6 pages.
Office Action dated Jun. 9, 2020, in corresponding Japanese patent Application No. 2018-513575, 7 pages.
Ericsson, "Further considerations on differentiated access control", 3GPP TSG-RAN WG2 Meeting #86, R2-141979, May 19-23, 2014, total 3 pages, Seoul, South Korea.
Huawei et al., Consideration on cell specific priority, 3GPP TSG-RAN WG2 Meeting #90, R2-152503, May 25-29, 2015, total 3 pages, Fukuoka, Japan.
Huawei et al., "Distributing idle UEs to multiple carriers", 3GPP TSG-RAN WG2 Meeting #91, R2-153402, Aug. 24-28, 2015, total 4 pages, Beijing, China.
Alcatel-Lucent, Verizon, Idle UE Distribution in Macro Only System and HetNets[online], 3GPP TSG-RAN WG2¡86 R2-142495, May 10, 2014.
ITRI, "Discussion on the idle mode UE distribution for multicarrier environment", 3GPP TSG RAN WG2 #90, R2-152357, May 25-29, 2015.

* cited by examiner

TELECOMMUNICATION DEVICES AND METHODS

CROSS-REFERENCE TO RELATED APPLICATIONS

This application claims priority to PCT/EP2016/069025 filed Aug. 10, 2016, and which claims priority to European Patent Application No. 15186123.4 filed Sep. 21, 2015. Both of these applications are incorporated herein in their entirety by reference.

TECHNICAL FIELD

The present disclosure relates to telecommunication devices and methods for communicating data in a telecommunication system.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Deploying multiple carriers is one of the most common solutions to address the ever increasing capacity needed in cellular networks, especially at traffic hotspots. This is noted in Work Item for Rel. 13, multicarrier load distribution in 3GPP TSG RAN Meeting #67 (RP-150611). This requires a balanced load among the multiple LTE carriers for efficient operation and optimal resources utilization. Load balancing across multiple carriers should consider a variety of deployment scenarios arising due to different capacities and the different numbers of the carriers available in a given area, especially when non-contiguous spectrum with multi-carriers of different bandwidths of different bands is involved, resulting in different number of carriers with different capacities in different areas.

For idle mode, it is observed that there is a strong correlation between the idle mode terminal device density and the active terminal device traffic load in a cell within an LTE or other cellular network cell. Hence, control of the idle mode terminal device distribution is an essential element for traffic load balancing. However, it is difficult to conduct idle-mode load balancing by the current specified mechanisms such as adjusting the reselection measurement threshold, broadcast or dedicated priorities. Furthermore, the deficiency in the current idle mode load balancing mechanisms has led to the partial reliance on redirection or handover (HO) after call establishment for load balancing. This has led to many more active redirections/HOs, increasing signalling load and HO failure rates. Additionally, even if load balance is achieved by HO and redirection, the situation will only last for a short period of time since terminal device will eventually follow idle mode cell reselection rules. The situation is worse in Heterogeneous Network scenarios where the load in the different small cells at same frequency layers might be different leading to ping-pongs and uneven idle terminal device distribution.

On the other hand, for connected mode, an ideal load balanced network should try to minimize active traffic overload probability while maximizing user throughput. However, current Reference Signal Receive Quality (RSRQ) based measurements as the HO and reselection metric may not be a good representation of the achievable throughput. Other measurements such as Signal to Information Noise Ratio (SINR) may be more appropriate for load-balancing active traffic so as to achieve optimal throughput for the user, while simultaneously avoiding unnecessary HO or redirections.

Therefore, load balancing should preferably be achieved already at RRC connection setup to minimize the need for load-triggered HO or redirection during connected mode. It is an aim of the present disclosure to address this issue

SUMMARY

According to the disclosure, there is provided a terminal device comprising receiver circuitry configured to receive parameter data from a base station in a cellular wireless telecommunication network, a storage device configured to store an identifier that uniquely identifies the terminal device and control circuitry configured to control the terminal device, when operating in an idle mode, to perform cell reselection using at least one cell reselection parameter derived from the received parameter data and the stored unique identifier.

Various further aspects and features of the present disclosure are defined in the appended claims and include a telecommunications device, a method of communicating data and circuitry for a telecommunication device.

BRIEF DESCRIPTION OF DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION

Figure 1:
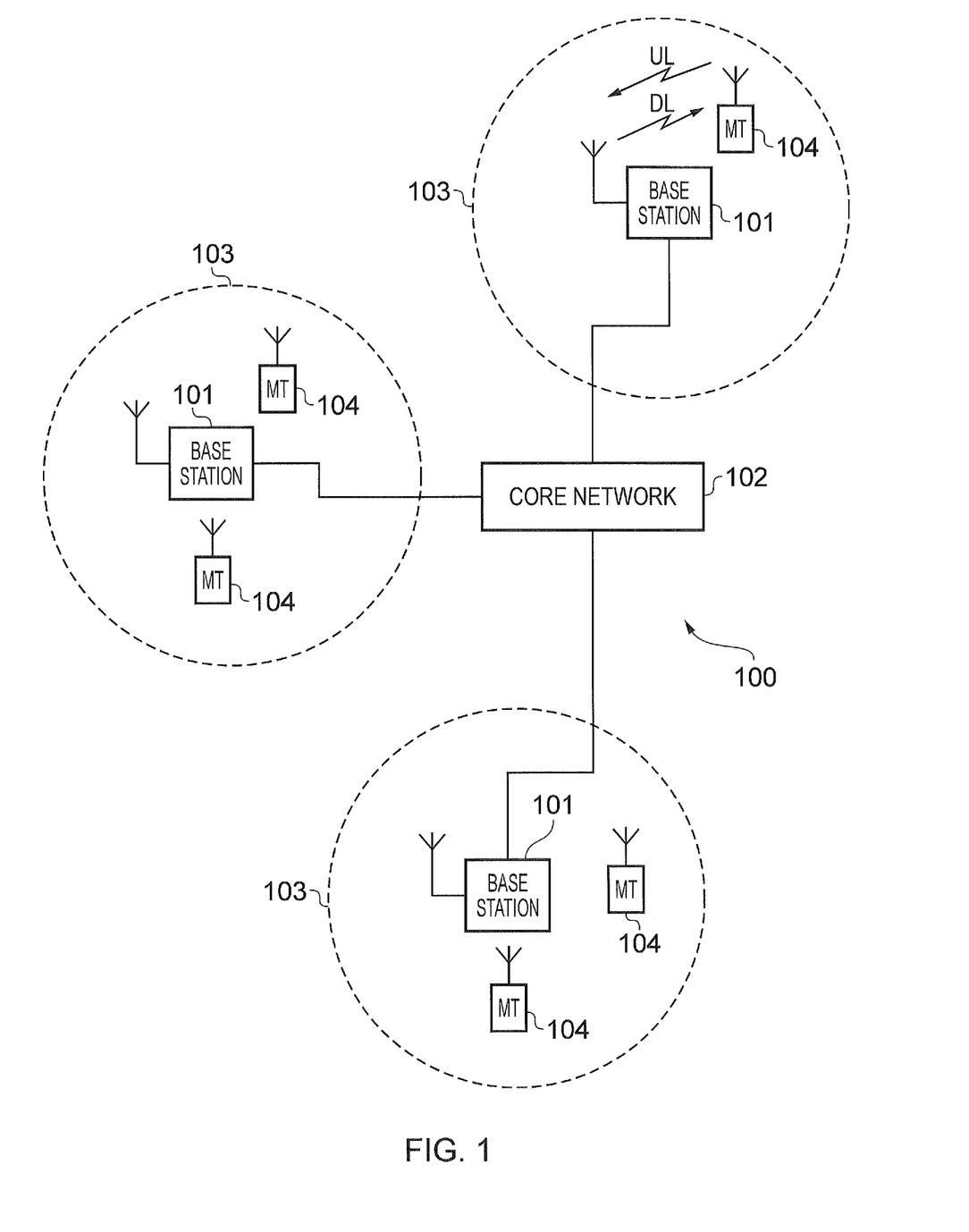
FIG. 1 is a schematic diagram illustrating an example of a mobile telecommunication system according to the present advancements.

FIG. 1 provides a schematic diagram illustrating some basic functionality of a mobile telecommunications network/system 100 operating in accordance with LTE principles and which may be adapted to implement embodiments of the disclosure as described further below. The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, terminal, mobile radio, and so forth. Base stations may also be referred to as transceiver stations/nodeBs/e-nodeBs, and so forth.

Figure 2:
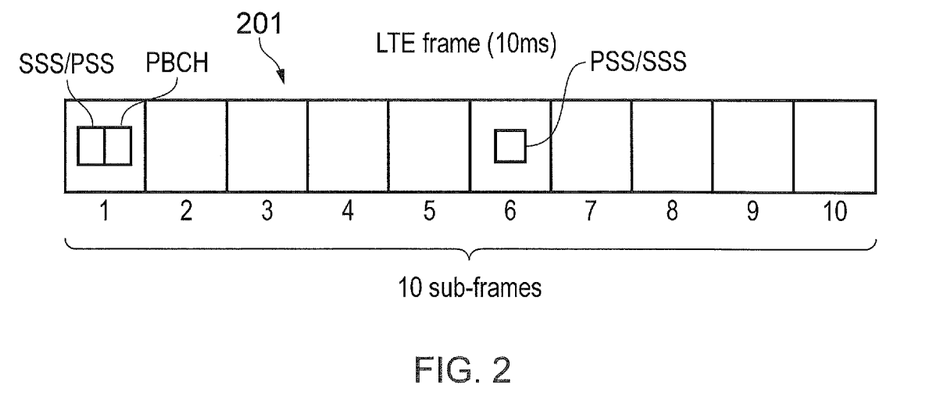
FIG. 2 is a schematic diagram illustrating a LTE radio frame according to exemplary aspects of the present advancements.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
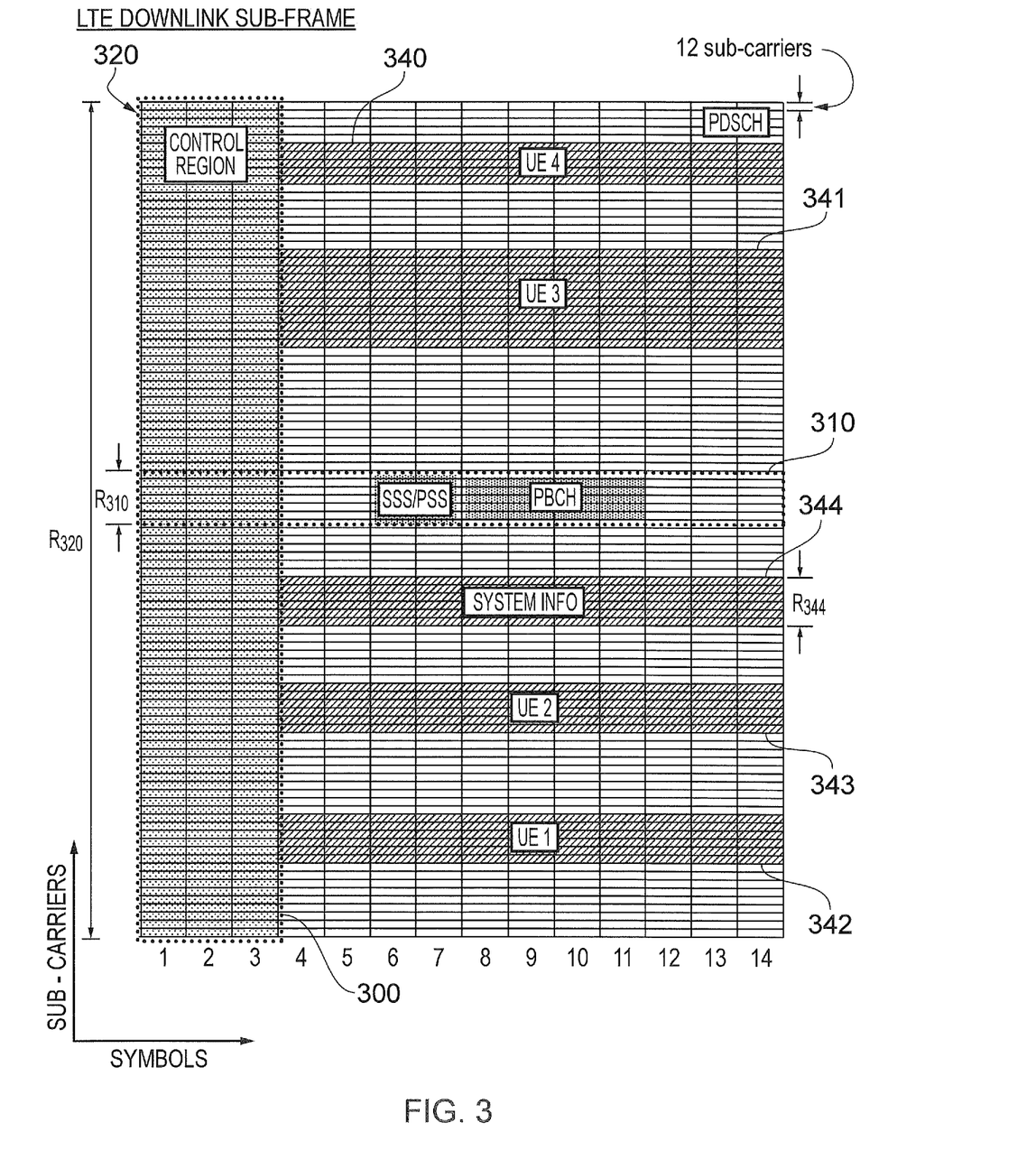
FIG. 3 is a schematic diagram illustrating an example of a LTE downlink radio subframe according to the present advancements.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licensed for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The control data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

Figure 4:
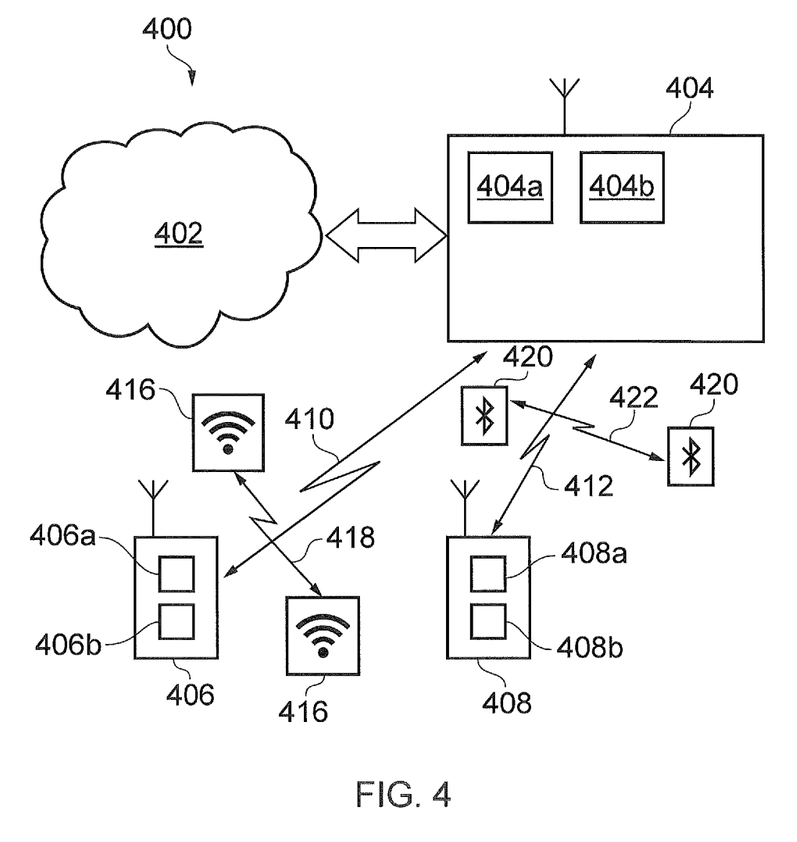
FIG. 4 is a schematic of an example wireless telecommunications system according to exemplary aspects of the present advancements.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406 and a second terminal device 408. It will of course be appreciated that in practice the radio network part may comprise a plurality of base stations serving a larger number of terminal devices across various communication cells. However, only a single base station and two terminal devices are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference for the telecommunications system 400. It will be appreciated that in practice there will typically be many more such devices operating in the radio environment of the wireless telecommunications system 400, and only two pairs of devices 416, 418 are shown in FIG. 4 for simplicity.

As with a conventional mobile radio network, the terminal devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices in the telecommunications system 400 via the base station 404. In order to maintain mobility management and connectivity, the core network part 402 also includes a mobility management entity (not shown) which manages the enhanced packet service, EPS, connections with the terminal devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal devices 406, 408 each comprise a transceiver unit 406*a*, 408*a* for transmission and reception of wireless signals and a controller unit 406*b*, 408*b* configured to control the operation of the respective devices 406, 408 in accordance with embodiments of the disclosure. Within the transceiver units 406*a*, 408*a* transmitter circuitry and/or receiver circuitry may be provided. The respective controller units 406*b*, 408*b* may each comprise a processor unit which is suitably configured/programmed to provide the desired functionality described herein using conventional programming/configuration techniques for equipment in wireless telecommunications systems. For each of the terminal devices 406, 408, their respective transceiver units 406*a*, 408*a* and controller units 406*b*, 408*b* are schematically shown in FIG. 4 as separate elements for ease of representation. However, it will be appreciated that for each terminal device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 406, 408 will in general comprise various other elements associated with their operating functionality in accordance with established wireless telecommunications techniques (e.g. a power source, possibly a user interface, and so forth).

Moreover, within each terminal device 406, 408 is provided a storage device. The storage device stores a unique identifier. The unique identifier is unique to each terminal device and is provided to uniquely identify and thus distinguish each terminal device from one another. The unique identifier is, in embodiments of the disclosure, a UE Identifier (hereinafter "UE-ID"). Of course, any kind of unique identifier is envisaged. For example, the unique identifier may be used to simply define into which group of terminal devices any one terminal device may be provided. In other words, the unique identifier is not necessarily a globally unique identifier, but may be any kind of identifier that allows grouping of the terminal devices.

As has become commonplace in the field of wireless telecommunications, terminal devices may support Wi-Fi and Bluetooth functionality in addition to cellular/mobile telecommunications functionality. Thus the transceiver units 406*a*, 408*a* of the respective terminal devices may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 406a, 408a of the terminal devices 406, 408 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 404a for transmission and reception of wireless signals and a controller unit 404b configured to control the base station 404. The controller unit 404b may comprise a processor unit which is suitably configured/programmed to provide the desired functionality described herein using conventional programming/configuration techniques for equipment in wireless telecommunications systems. The transceiver unit 404a and the controller unit 404b are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404b.

Thus, the base station 404 is configured to communicate data with the first and second terminal devices 406, 408 over respective first and second radio communication links 410, 412.

As will be appreciated by the skilled person, the terminal devices 406, 408 operate in two modes. The first mode is the Radio Resource Control (RRC) idle mode (hereinafter "idle mode") and the RRC connected mode (hereinafter 'connected mode'). The idle mode is where radio is not active, but an identity is provided to the terminal device and tracked by the network. The connected mode is where there is active radio operation with the base station and the network.

In the idle mode, cell-reselection and associated measurements take place. Additionally, other steps such as i) network selection is performed and ii) System Information Broadcast Blocks (SIB blocks) are monitored. The present disclosure relates to cell-reselection in the idle mode.

Cell-Reselection

A terminal device performs cell-reselection when the serving cell's radio carrier strength is poor or a suitable high strength neighbour cell is available. In order to allow the terminal device to know onto which frequencies or cells to measure, and to provide the parameters used for evaluating which frequency or cell to (re)select, the base station provides each terminal device with a list of frequencies and cells and their associated cell reselection priorities, thresholds and offsets to be used in cell reselection evaluation. This list of cells may be specified in any of SIB4, 5, 6, 7 and RRC Connection Release as would be appreciated by the skilled person.

In other words, after an initial selection of a cell, and according to a defined set of criteria the terminal device measures the RSRP of the selected cell and the neighbouring cells and if the cell reselection criteria is met, cell-reselection will be performed. The cell reselection priorities and the associated thresholds and offsets are chosen by the network. This known mechanism of cell reselection has a drawback.

The current mechanism does not allow load balancing across multiple carriers when terminal devices operate in idle mode.

Presently, two different mechanisms have been discussed to address this load balancing issue. The first mechanism is a continuous randomisation mechanism and the second mechanism is a "one-shot" mechanism.

Continuous Randomisation Mechanism

In this mechanism the known cell reselection mechanism and rules will be followed as much as possible. However, in addition, a randomisation element will be applied at each terminal device. In general, a terminal device will generate one random number which will then be compared against one or more pre-configured parameters in order to decide whether reselection to one candidate cell will occur or not. The redistribution of terminal devices (or the load balancing) is realised by having statistically distributed random values. The pre-configured parameters will therefore need to be periodically broadcast or provided in the system information.

This mechanism has a number of drawbacks. Firstly, as the randomisation scheme within each terminal device determines the load balancing, the network has little control over the load balancing. This is particularly undesirable as the behaviour of terminal devices in situations like this can be unpredictable. A second drawback is that some companies have had legal issues in the past with schemes involving drawing a random number and so are apprehensive about adopting such a scheme. This will reduce the effectiveness of such a load balancing scheme if there is little adoption.

"One-Shot" Mechanism

In this mechanism the network will redistribute the terminal devices if the network discovers an imminent congestions situation. A terminal device (or a group of terminal devices) can be paged for the purpose of load balancing. The paging message may contain a trigger to activate previously (i.e. in RRC Connection Release) acquired Dedicated Priorities. When the trigger is received, the terminal device(s) start appropriate timer and apply the dedicated priorities. The paging message may also contain a de-prioritisation request to instruct the terminal device(s) that currently prioritized carrier/cell should be temporarily assigned the lowest priority. This will be for a period of time set by a timer. Alternatively, the paging message may contain a prioritisation request to temporarily assign the highest priority to a certain carrier/cell. Eventually, the paging message can comprise a whole new set of priorities. These priorities are similar to Dedicated Priorities and are aimed for a subset of terminal devices, if the network discovers that previously sent priorities will not suffice to mitigate current load situation. New parameters in the paging message are needed in order to run abovementioned actions (e.g. new priority or intended reselection target frequency/cell).

This mechanism has drawbacks too. Firstly, as is apparent from the above, this mechanism is complex and requires a high paging load. As each individual terminal device needs to be individually paged and dedicated priorities provided, this creates an excessive load. In addition, most operators do not implement and do not wish to implement dedicated priorities, for instance cell reselection priorities provided in RRC connection release or otherwise by dedicated signalling.

It is an aim of the disclosure to address the load balancing issue in idle mode without the drawbacks of the two above noted mechanisms.

In a terminal device according to embodiments of the disclosure has a unique identifier. The unique identifier is described with reference to FIG. 4. The unique identifier is stored within the terminal device and uniquely identifies the terminal device from other terminal devices.

It is envisaged that any previously provided UE-identifier (UE-ID) may be used as the unique identifier, although the disclosure is not so limited. For example, the International Mobile Equipment Identity (IMEI) or the International Mobile Subscriber Identity (IMSI) or a radio network temporary identifier (RNTI) may be used as the unique identifier.

The network broadcasts (or otherwise provides to the terminal device) parameters which will be used with the UE-ID to provide load balancing. The parameters may be broadcast to the terminal devices within a cell or may be provided over dedicated signalling such as the RRC Connection Release, or may be provided in advance to the terminal device. The parameters will be explained later.

The parameters provided to the terminal devices include at least one of the following two parameters.

The first is multiple cell reselection offsets. The cell reselection offset that will be used by the terminal device will be selected based on the UE-ID. The second parameter is the multiple absolute priorities for the frequency or cell. The priority used by the terminal device, again, will be selected based on the UE-ID.

In addition to the above two parameters, the network will provide a parameter controlling the percentage of terminal devices applying a specific offset or priority or a parameter controlling the amount of offset or relative priority applied (depending upon which of the above parameters are provided). In this case, it should be noted that the network may provide either the parameter controlling the percentage or the parameter controlling the amount of offset, or alternatively the network may provide both of these parameters.

To illustrate the above, let us consider the example of a network providing multiple priority levels for a particular cell (priority A=1, priority B=2) and 40% of the terminal devices should use priority A and 60% should use priority B.

In order to determine whether the terminal device should use priority A or priority B, the terminal device checks its UE-ID and if, for example, the last digit in the UE-ID is a 0, 1, 2, 3 then terminal device knows it must use priority A and if the last digit in the UE-ID is 4, 5.6, 7, 8.9, then the terminal device knows it must use priority B. As the likelihood of any terminal device having a particular last digit in its UE-ID is statistically equal, then the load will be balanced. This allows the network, with certainty, to know that the load will be balanced without the complex paging of the one shot mechanism. Of course, although the final digit is noted above, any particular feature of the UE-ID may be used to determine the selection of the parameter. A detailed example is provided later.

A more detailed description of the parameters is now provided.

Multiple Cell Reselection Offsets

Currently the network can broadcast a cell-specific and/or frequency specific offset which the terminal device applies to the cell reselection evaluation according to the rules set out in 3GPP TS 36.304.

The network also broadcasts a hysteresis value to be applied.

Qoffset$_{s,n}$
This specifies the offset between the two cells.

Qoffset$_{frequency}$
Frequency specific offset for equal priority E-UTRAN frequencies.

Q$_{hyst}$
This specifies the hysteresis value for ranking criteria.

For intra-frequency and equal priority frequencies, the terminal device performs ranking according to the following criteria using the parameters mentioned above, along with the RSRP measurements of the current and neighbouring cells.

The cell-ranking criterion R$_s$ for serving cell and Rn for neighbouring cells is defined by:

$$R_s = Q_{meas,s} + Q_{Hyst} - Q\text{offset}_{temp}$$

$$R_n = Q_{meas,n} - Q\text{offset} - Q\text{offset}_{temp}$$

where:

| | |
|---|---|
| Q$_{meas}$ | RSRP measurement quantity used in cell reselections. |
| Qoffset | For intra-frequency: Equals to Qoffset$_{s,n}$, if Qoffset$_{s,n}$ is valid, otherwise this equals to zero. For inter-frequency: Equals to Qoffset$_{s,n}$ plus Qoffset$_{frequency}$, if Qoffset$_{s,n}$ is valid, otherwise this equals to Qoffset$_{frequency}$. |
| Qoffset$_{temp}$ | Offset temporarily applied to a cell |

In one embodiment of this disclosure, the network broadcasts two or more values for either offset or hysteresis, and the terminal device applies one of those values depending on a function of UE-ID.

Multiple Absolute Priorities

Currently the network signals an absolute priority to be applied to a specific frequency when performing cell reselection evaluation. In addition, it may be possible for the network to provide cell-specific absolute priority in order to distribute terminal devices amongst cells on the same frequency. For example, small cells may be used for capacity increase. In addition, cell reselection thresholds are, in embodiments, provided for each of the frequencies and/or cells.

cellReselectionPriority

This specifies the absolute priority for E-UTRAN frequency or UTRAN frequency or group of GERAN frequencies or band class of CDMA2000 HRPD or band class of CDMA2000 ixRTT.

Thresh$_{X,HighP}$
This specifies the Srxnev threshold (in dB) used by the terminal device when reselecting towards a higher priority RAT/frequency than the current serving frequency. Each frequency of E-UTRAN and UTRAN, each group of GERAN frequencies, each band class of CDMA2000 HRPD and CDMA2000 1×RTT might have a specific threshold.

Thresh$_{X,HighQ}$
This specifies the Squal threshold (in dB) used by the terminal device when reselecting towards a higher priority RAT/frequency than the current serving frequency. Each frequency of E-UTRAN and UTRAN FDD might have a specific threshold.

Thresh$_{X,LowP}$
This specifies the Srxlev threshold (in dB) used by the terminal device when reselecting towards a lower priority RAT/frequency than the current serving frequency. Each frequency of E-UTRAN and UTRAN, each group of GERAN frequencies, each band class of CDMA2000 HRPD and CDMA2000 1×RTT might have a specific threshold.

Thresh$_{Serving,LowQ}$
This specifies the Squal threshold (in dB) used by the terminal device when reselecting towards a lower priority RAT/frequency than the current serving frequency. Each frequency of E-UTRAN and UTRAN FDD might have a specific threshold.

$Thresh_{Serving,LowP}$

This specifies the Srxlev threshold (in dB) used by the terminal device on the serving cell when reselecting towards a lower priority RAT/frequency.

$Thresh_{Serving,LowQ}$

This specifies the Squal threshold (in dB) used by the terminal device on the serving cell when reselecting towards a lower priority RAT/frequency.

As noted above, the reselection rules are defined in 3GPP TS 36.304 section 5.2.4.5 for different priority layers (where layer means frequency or RAT). However, in the context of the present disclosure, the most important two rules are 1) Higher Priority A cell of a higher priority UTRAN TDD, GERAN or CDMA2000 RAT/frequency fulfils Srxlev>$Thresh_{X,HighP}$ during a time interval $Treselection_{RAT}$.

2) Lower Priority

Cell reselection to a cell on a lower priority E-UTRAN frequency or inter-RAT frequency than the serving frequency shall be performed if:

The serving cell fulfils Srxlev<$Thresh_{Serving,LowP}$ and a cell of a lower priority RAT/frequency fulfils Srxlev>$Thresh_{X,LowP}$ during a time interval $Treselection_{RAT}$;

In one embodiment of this disclosure, the network broadcasts two or more values for this cellReselectionPriority. Optionally to the embodiment, multiple thresholds may also be broadcast, and the terminal device applies one of those values depending on the UE-ID.

Parameter Controlling the Percentage of UEs Applying a Specific Offset or Priority In order to explain this parameter, we need to use some examples of what the function of UE-ID could be.

In one embodiment of the disclosure, the UE-ID may be the identifier used by the terminal device to calculate paging occasions and paging frames. This is in accordance with 3GPP TS 36.304 (the relevant section being provided in Annex A).

The intention of the calculation for paging occasions shown in Annex A, is to distribute terminal devices evenly amongst the available resources. In other words, for any specific terminal device the function is not random, when you consider all of the terminal devices in the cell, this is randomised and evenly distributed.

One possibility for this disclosure is to always distribute terminal devices evenly amongst the allowed/signalled offsets or priorities. However, this does not meet the requirement that the network should be able to control what percentage (or fraction) of terminal devices are distributed to what frequency. Therefore, it would be beneficial to control the percentage of terminal devices. It might also be beneficial to explicitly specify which UE-IDs shall apply which priority.

A more detailed example as briefly explained above is now provided.

In the following example the network broadcasts the percentage (e.g. an integer value ranging from 0 (0%) to 10 (100%). Let's call the value N.

For example the network broadcasts the value N=4 (40%).

The terminal device calculates UE-ID mod 10—which will result in a value from 0-9.

If the value is <4 then the terminal device selects the first priority. If the value is >=4 then the terminal device selects the second priority. This function can be written as If UE-ID mod 10<N
Select first priority
Else
Select second priority This allows the network to control the percentage of terminal devices selecting the first signalled priority (which might be relatively low) and the percentage of terminal devices selecting the second signalled priority (which might be relatively high) and hence achieving the objective of distributing a fraction of the terminal devices amongst frequencies or cells. Either the first or second priority could be a legacy signalled value. As would be appreciated, the legacy signalled value is a value currently sent in System Information to all terminal devices. This value, in embodiments, may also be sent with an additional priority as an alternative value depending on the UE-ID. The absence of the value N could indicate equal distribution (50/50 split amongst the two signalled priorities—so N=5). In other words, the terminal device will assume a distribution unless told by the network. In this case, the network will inform the terminal device of the change. That is, the value N provided by the network might be added or subtracted to the legacy signalled value (for example if N=2 and legacy value=3 then additional priority value=5). This default assumption has the advantage that should the default be the usual choice of the network, then signalling will be reduced as the network will only signal the terminal device(s) should the default assumption not be correct.

One additional option is to use a fixed offset or priority value (or a default if not signalled)—for example if the second priority is not signalled, then the terminal device applies the highest (or lowest) possible priority if the UE-ID function is satisfied The same idea can be applied for a list of more than two priorities. The network would just then signal the percentage of terminal devices to apply each of the priorities.

An additional control parameter could apply an offset to UE-ID. This would allow the network to vary which of the UE-IDs apply which priority. For example offset value would be a number in the range 0-9 called "X".

If (UE-ID+X) mod 10<N
Select first priority
Else
Select second priority

The network might periodically update the parameter X, to allow different sets of terminal devices to communicate with the base station on different frequencies.

Another alternative is to provide a list specifying precisely which UE-ID applies which priority. For example, along with the first signalled priority the network provides a list of numbers in the range 0-9.

For example priority 1 is signalled along with values 1, 4, 5, 7. Then all terminal devices with UE-ID mod 10=1, 4, 5, or 7 shall apply this priority, and other UE-ID shall apply another priority (which might be the default legacy value).

Parameter Controlling the Amount of Offset, or Relative Priority

This parameter would be used as an alternative to signalling explicit priorities or offsets and using the UE-ID to specify the percentage or fraction.

Instead of selecting one of the signalled values, the terminal device calculates a priority or offset based on the UE-ID.

For example, currently the cell reselection priority can be given a value 0-7. Therefore to evenly spread the priorities a function could be used as follows.

UE-ID mod 8=cell reselection priority.

Similarly, the applied offset could be calculated based on UE-ID

UE-ID mod 4*signalledOffset=Offset

Figure 5:
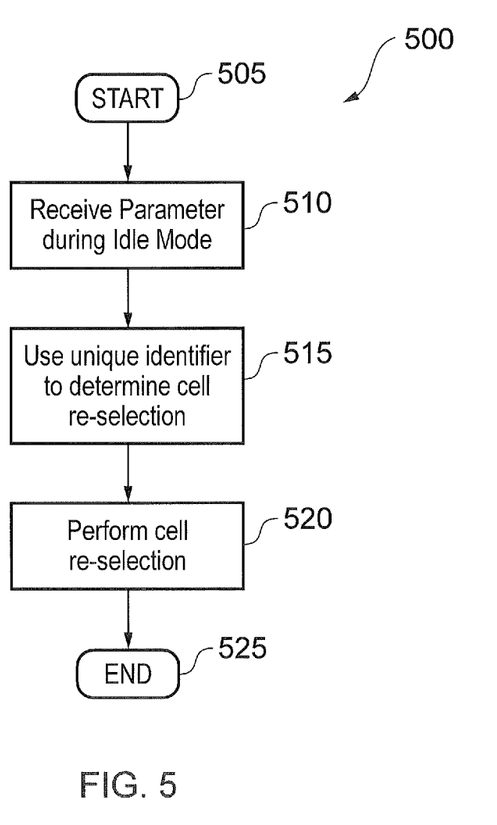
FIG. 5 is a flowchart of the process performed by the terminal device according to exemplary aspects of the present advancements.

FIG. 5 shows a flowchart 500 showing the steps carried out by the terminal device. The process starts at step 505. The terminal device receives the parameter data from the base station in step 510. Although FIG. 5 refers to receiving the parameter data during idle mode (for example in system information broadcast and/or paging), as noted above, the disclosure is not so limited and the parameter data may be provided during the RRC connection release or at any appropriate time. The terminal device then uses its unique identifier (for example the UE-ID) and the parameter data to determine the cell-reselection in step 515. The terminal device then performs cell-reselection in step 520. The process ends at step 525.

Discontinuous Reception for Paging

The following is a brief description of discontinuous reception for paging according to exemplary aspects the advancements described herein.

The UE may use Discontinuous Reception (DRX) in idle mode in order to reduce power consumption. One Paging Occasion (PO) is a subframe where there may be P-RNTI transmitted on PDCCH addressing the paging message. One Paging Frame (PF) is one Radio Frame, which may contain one or multiple Paging Occasion(s). When DRX is used the UE needs only to monitor one PO per DRX cycle.

PF and PO is determined by following formulae using the DRX parameters provided in System Information:

PF is given by following equation:

SFN mod $T=(T$ div $N)*(UE\_ID$ mod $N)$

Index i_s pointing to PO from subframe pattern defined in 7.2 will be derived from following calculation:

$i\_s$=floor(UE_ID/N)mod $Ns$

System Information DRX parameters stored in the UE shall be updated locally in the UE whenever the DRX parameter values are changed in SI. If the UE has no IMSI, for instance when making an emergency call without USIM, the UE shall use as default identity UE_ID=0 in the PF and i_s formulas above.

The following Parameters are used for the calculation of the PF and i_s:
  T: DRX cycle of the UE. T is determined by the shortest of the UE specific DRX value, if allocated by upper layers, and a default DRX value broadcast in system information. If UE specific DRX is not configured by upper layers, the default value is applied.
  nB: 4T, 2T, T, T/2, T/4, T18, T/16, T/32.
  N: min(T,nB)
  Ns: max(1,nB/T)
  UE_ID: IMSI mod 1024.

IMSI is given as sequence of digits of type Integer (0 . . . 9), IMSI shall in the formulae above be interpreted as a decimal integer number, where the first digit given in the sequence represents the highest order digit.

For example:

IMSI=12(digit1=1,digit2=2)

In the calculations, this shall be interpreted as the decimal integer "12", not "1×16+2=18".

The present disclosure, although discussed in respect of (and particularly suitable to) a 3GPP—and optionally LTE—mobile system, is not limited to these examples. Likewise, although the description uses terms which can sometimes be based on current names or features of the 3GPP or other standards, the teachings of the present disclosure are not limited to this existing procedures or standards and are intended to apply to any suitable arrangement.

The following clauses define further example aspects and features of the present technique:

1. A terminal device comprising receiver circuitry configured to receive parameter data from a base station in a cellular wireless telecommunication network, a storage device configured to store an identifier that uniquely identifies the terminal device and control circuitry configured to control the terminal device, when operating in an idle mode, to perform cell reselection using at least one cell reselection parameter derived from the received parameter data and the stored unique identifier.

2. A terminal device according to clause 1, wherein the identifier is a UE Identifier.

3. A terminal device according to clause 2, wherein the UE Identifier is an International Mobile Subscriber Identity.

4. A terminal device according to clause 1, 2 or 3 wherein the cell reselection parameter is one of a multiple cell reselection offsets or multiple absolute priorities for the frequency or cell.

5. A terminal device according to clause 4, wherein the parameter data contains multiple cell reselection offsets or multiple absolute priorities for the frequency or cell.

6. A terminal device according to clause 4, wherein the control circuitry is configured to calculate a priority or offset based on the unique identifier.

7. A terminal device according to clause 4, wherein the parameter data further includes either i) a parameter controlling a percentage of terminal devices applying a specific offset value or priority or ii) a parameter controlling the amount of offset or relative priority applied.

8. A terminal device according to clause 4, wherein the offset value provides a difference value from a default percentage.

9. A terminal device according to clause 6, wherein the offset value provides a difference value from a default percentage.

10. A terminal device according to clause 7, wherein the parameter data further includes an offset to be applied to the stored unique identifier.

11. A communication system comprising a base station in with a terminal device according to any one of clauses 1 to 10.

12. A method of operating a terminal device in a cellular wireless telecommunication network, the method comprising receiving parameter data from a base station in the cellular wireless telecommunication network, storing an identifier that uniquely identifies the terminal device and controlling the terminal device, when operating in an idle mode, to perform cell reselection using at least one cell reselection parameter derived from the received parameter data and the stored unique identifier.

13. A method according to clause 12, wherein the identifier is a UE Identifier.

14. A method according to clause 13, wherein the UE Identifier is an International Mobile Subscriber Identity.

15. A method according to clause 12, 13 or 14 wherein the cell reselection parameter is one of a multiple cell reselection offsets or multiple absolute priorities for the frequency or cell.

16. A method according to clause 15, wherein the parameter data contains multiple cell reselection offsets or multiple absolute priorities for the frequency or cell.

17. A method according to clause 15, comprising calculating a priority or offset based on the unique identifier.

18. A method according to clause 15, wherein the parameter data further includes either i) a parameter controlling a percentage of terminal devices applying a specific offset value or priority or ii) a parameter controlling the amount of offset or relative priority applied.

19. A method according to clause 15, wherein the offset value provides a difference value from a default percentage.

20. A method according to clause 17, wherein the offset value provides a difference value from a default percentage.

21. A method according to clause 18, wherein the parameter data further includes an offset to be applied to the stored unique identifier.

22. A computer program product comprising computer readable instructions which, when loaded onto a computer, configures the computer to perform a method according to any one of clause 12 to 21.

The invention claimed is:

1. A terminal device comprising:
    receiver circuitry configured to receive at least one system information block including parameter data from a base station in a cellular wireless telecommunication network, the parameter data including at least absolute priorities for frequencies;
    a storage device configured to store an identifier that uniquely identifies the terminal device; and
    control circuitry configured to control the terminal device, when operating in an idle mode, to perform cell reselection using the absolute priorities for frequencies included in the received parameter data and the stored unique identifier.

2. The terminal device according to claim I, wherein the identifier is a UE Identifier.

3. The terminal device according to claim 2, Identifier is an International Mobile Subscriber Identity (IMSI).

4. The terminal device according to claim 1, wherein the cell reselection parameter includes multiple cell reselection offsets.

5. The terminal device according to claim 4, wherein the parameter data includes multiple cell reselection offsets.

6. The terminal device according to claim 4, wherein the control circuitry is configured to calculate a priority or offset based on the unique identifier.

7. The terminal device according to claim 4, wherein the parameter data further includes either i) a parameter controlling a percentage of terminal devices applying a specific offset value or priority or ii) a parameter controlling the amount of offset or relative priority applied.

8. The terminal device according to claim 4, wherein the multiple cell reselection offsets provide difference values from a default percentage.

9. The terminal device according to claim 6, wherein the multiple cell reselection offsets provide difference values from a default percentage.

10. The terminal device according to claim 7, wherein the parameter data further includes an offset to be applied to the stored unique identifier.

11. A communication system comprising:
    a terminal device according to claim 1; and
    a base station in communication with the terminal device.

12. A method of operating a terminal device in a cellular wireless telecommunication network, the method comprising:
    receiving at least one system information block including parameter data from a base station in the cellular wireless telecommunication network, the parameter data including at least absolute priorities for frequencies;
    storing an identifier that uniquely identifies the terminal device; and
    controlling the terminal device, when operating in an idle mode, to perform cell reselection using the absolute priorities for frequencies included in the received parameter data and the stored unique identifier.

13. The method according to claim 12, wherein the identifier is a UE Identifier.

14. The method according to claim 13, wherein the UE Identifier is an International Mobile Subscriber Identity (IMSI).

15. The method according to claim 12 wherein the cell reselection parameter includes multiple cell reselection offsets.

16. The method according to claim 15, wherein the parameter data includes multiple cell reselection offsets.

17. The method according to claim 15, further comprising calculating a priority or offset based on the unique identifier.

18. The method according to claim 15, wherein the parameter data further includes either i) a parameter controlling a percentage of terminal devices applying a specific offset value or priority or ii) a parameter controlling the amount of offset or relative priority applied.

19. The method according to claim 15, wherein the multiple cell reselection offsets provide difference values from a default percentage.

20. The method according to claim 17, wherein the multiple cell reselection offsets provide difference values from a default percentage.

21. The method according to claim 18, wherein the parameter data further includes an offset to be applied to the stored unique identifier.

22. A non-transitory computer-readable medium encoded with computer readable instructions that, when executed by a computer, cause the computer to perform a method according to claim 12.

* * * * *